Figure 1A:
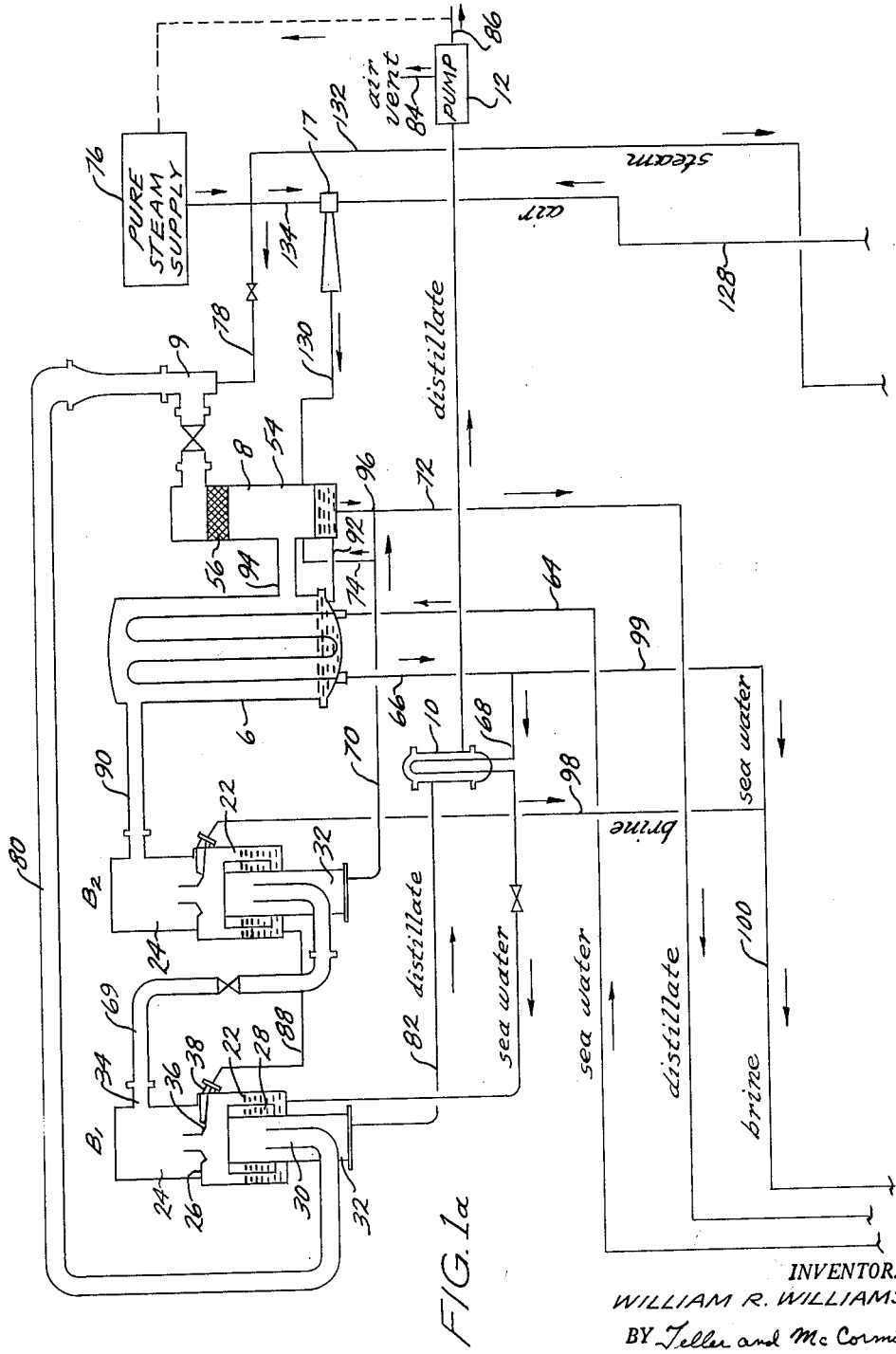

Nov. 3, 1964 W. R. WILLIAMSON 3,155,600
MULTI-STAGE PROCESS AND APPARATUS FOR DISTILLING SEA WATER
Filed May 16, 1960 2 Sheets-Sheet 1

INVENTOR.
WILLIAM R. WILLIAMSON
BY Teller and McCormick
ATTORNEYS

Nov. 3, 1964  W. R. WILLIAMSON  3,155,600
MULTI-STAGE PROCESS AND APPARATUS FOR DISTILLING SEA WATER
Filed May 16, 1960  2 Sheets-Sheet 2

INVENTOR.
WILLIAM R. WILLIAMSON
BY Teller and McCormick
ATTORNEYS ably of the "basket" type which has a deeply corrugated periphery. Steam or other heating medium flowing from an inlet conduit 30 passes through the corrugations of the heat exchanger 28 and into out-of-contact heat exchange relationship with the impure water located in the bottom of the boiler chamber and surrounding the outside of the heat exchanger. At the bottom of the heat exchanger 28

3,155,600
MULTI-STAGE PROCESS AND APPARATUS FOR DISTILLING SEA WATER

William R. Williamson, Wethersfield, Conn., assignor to American Machine & Foundry Company, Inc., New York, N.Y., a corporation of New Jersey
Filed May 16, 1960, Ser. No. 29,276
3 Claims. (Cl. 202—53)

This invention relates to methods and apparatus for evaporating and condensing sea water to produce potable water, and more particularly relates to improvements in methods and apparatus employed in a sea water distillation system having a plurality of flash evaporator stages in each of which sea water or brine is both evaporated and condensed.

The general object of this invention is to provide a distillation plant and a method of distillation which will produce relatively pure water from impure water such as sea water at a high efficiency as expressed in pounds of distillate per pound of fuel.

Another object of this invention is to improve the efficiency of a sea water distillation system having a plurality of flash evaporators by providing improved methods and apparatus by which the heat transfer in the flash evaporator is increased and by which the pressure differential between the various evaporators may be maintained at optimum values.

A more specific object of this invention is to provide improved methods and apparatus for removing air and other non-condensables from the various stages of a multi-stage flash evaporating system for distilling impure water, such air removal being made in such a manner that desired pressure differentials between the stages are obtained and air is removed from each stage at a rate sufficient to prevent the accumulation of an undue amount of air in the stage. If not properly withdrawn the air or other noncondensables tend to decrease the thermal efficiency of the stage by collecting around the condenser tubes and preventing the water vapor from coming into proper contact therewith.

Other objects and advantages of the invention will be apparent from the drawings and from the description which follows.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1B:
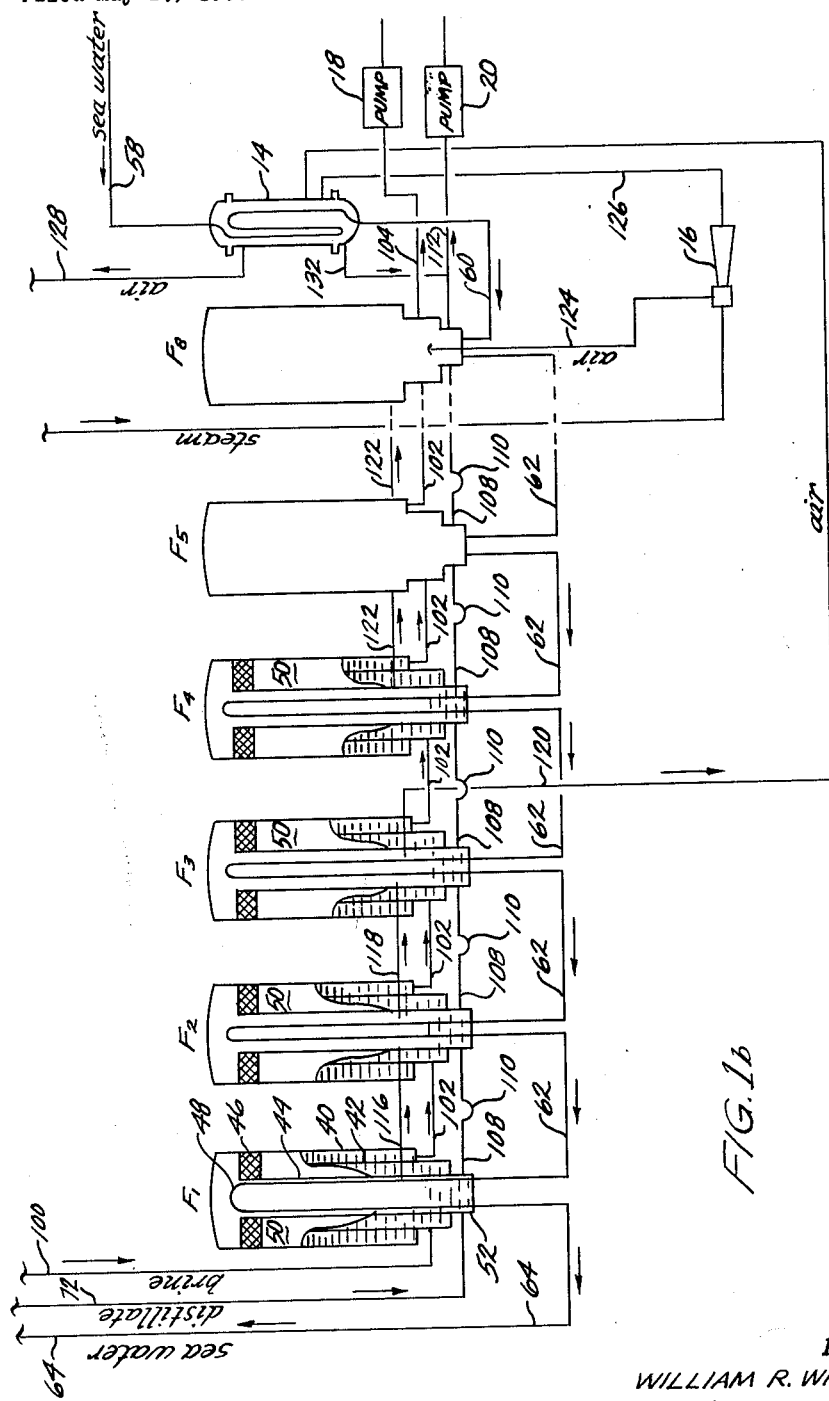

In the drawings FIG. 1a and FIG. 1b are to be taken together as constituting a single view, it being intended that FIG. 1a be placed above FIG. 1b to obtain the single view. The view provided by FIGS. 1a and 1b is a schematic showing of a distillation plant provided in accordance with the present invention, with various gauges, meters and other auxiliary items which are employed in the actual plant but not necessary to this invention being omitted for clarity.

The distillation plant or system shown by the drawings is adapted to convert impure water, such as sea water, into a potable water suitable for drinking purposes or for use in boilers. The plant includes two distillation phases. In the first phase, which is shown generally by FIG. 1a, impure water is heated and evaporated by out-of-contact heat exchange with a heating medium. In the second phase, which is shown generally by FIG. 1b, impure water is distilled by a plurality of flash evaporators. Both of the phases of the system produce a potable distillate and each could be run with minor changes as a separate distillation unit. It has been found, however, that the combination of the second multiple flash phase with the first out-of-contact evaporating phase is particularly advantageous in that the multiple flash phase is able to use beneficially the heat remaining in the products discharged from the first phase. Therefore, in this manner the overall efficiency of the system is greatly increased.

The first or out-of-contact evaporating phase of the system, as shown in FIG. 1a, consists primarily of one or more out-of-contact evaporating units $B_1$ and $B_2$ which are so interconnected and operated as to provide what is known as double effect operation, the evaporator $B_1$ providing the first effect and the evaporator $B_2$ providing the second effect. In addition, the first phase includes a main condenser 6 for condensing the vapors discharged from the second effect evaporator $B_2$ and a demister 8 which serves to remove entrained liquid from the vapors recirculated to the first effect evaporator $B_1$. This recirculation is effected by a jet compressor 9. A feed water heater 10 cools the distillate and heats the feed of the first effect evaporator $B_1$, and a vacuum pump 12 is employed to draw the distillate from the heater 10.

The second phase of the system consists primarily of a plurality of flash evaporators which are interconnected in what may be described as a "cascade" relationship. The number of flash evaporators may vary with different systems and may employ recirculated brine without departing from the scope of this invention, but for purposes of discussion the present system will be described as including eight flash evaporators designated generally as $F_1$ to $F_8$, respectively. In FIG. 1b only six of the flash evaporators are illustrated. Two evaporators connected between the evaporator $F_5$ and the evaporator $F_8$ have been omitted for clarity. However, it should be understood that two additional flash evaporators are included in the second phase and connected between the evaporators $F_5$ and $F_8$ in a manner similar to the way in which the other evaporators are interconnected. Of course, since the total number of flash evaporators may vary it is possible that more or less than two evaporators could be located between the evaporator $F_5$ and the evaporator $F_8$. The present system will be described as including eight flash evaporators since that number of evaporators was employed in one system which was actually constructed and operated. The second phase, in addition to the flash evaporators, also includes an air cooler or vent condenser 14 and two air ejectors 16 and 17 which serve purposes hereinafter described. Two pumps 18 and 20 serve respectively to pump brine and distillate from the discharge end of the flash or second phase.

The out-of-contact evaporator units $B_1$ and $B_2$ employed in the first phase of the system are or may be of generally conventional construction. A suitable construction of an evaporator which may be used is shown in my copending U.S. patent application Serial No. 563,571, filed February 6, 1956, and in my copending U.S. patent application Serial No. 733,287, filed May 6, 1956, to which applications reference is made for a more detailed showing and discussion of the construction and operation of the units $B_1$ and $B_2$. For the present purposes it will be sufficient to note that each of the units $B_1$ and $B_2$ comprises a boiler chamber 22 and a separating chamber 24 separated by a transverse partition 26. In the boiler chamber 22 is a heat exchanger 28 which is preferably of the "basket" type which has a deeply corrugated periphery. Steam or other heating medium flowing from an inlet conduit 30 passes through the corrugations of the heat exchanger 28 and into out-of-contact heat exchange relationship with the impure water located in the bottom of the boiler chamber and surrounding the outside of the heat exchanger. At the bottom of the heat exchanger 28 is a steam chest 32 into which drains water condensed from the heated steam passing through the heat exchanger. The heat transferred to the impure water in the boiler 22 causes it to boil and the vapors released therefrom pass upwardly from the boiler chamber 22, through the partition 26 and into the separating chamber 24. In the separating chamber 24 the vapors are swirled about by means not shown to effect a separation from the vapors of the major portion of any entrained liquid contained in the vapors. The vapors then pass out of the separating chamber through the discharge outlet 34, and the liquid or brine separated from the vapor flows downwardly into an annular brine sump 36 formed in the transverse partition 26. Brine which collects in the sump 36 is drained therefrom through an outlet 38 which communicates with the sump 36. As used herein, the term "brine" refers generally to impure water from which some pure water has been evaporated. In other words, the brine generally contains a greater amount of impurities per unit of volume than does the initial impure water, generally sea water, supplied to the system.

The flash evaporators $F_1$ to $F_8$, inclusive, are also of generally conventional construction, and one suitable construction is shown in the copending U.S. patent application to Williamson and Fraser, Serial No. 725,263, filed March 31, 1958, to which application reference is made for a more detailed description of the structure and operation of the flash evaporators $F_1$ to $F_8$.

For the purpose of describing the present invention it is sufficient to note that each of the flash evaporators includes an outer shell 40, an inner shell 42 and a condenser housing 44, all three of which are concentrically arranged about a common vertical axis. The outer shell 40 is closed at its top and bottom. The inner shell 42 is closed at its bottom and extends upwardly through the bottom of the outer shell 40 and a substantial distance therebeyond so that the top edge thereof provides a spill-over weir as will later be described. The condenser housing 44 extends upwardly beyond the inner shell 42 and adjacent its upper portion there is provided an annular wire mesh demister 46 positioned in the annular space between the outer wall of the condenser housing and inner wall of the outer shell. Inside the condenser housing 44 is a condenser 48 which is of conventional construction and includes a plurality or bundle of condenser tubes through which cooling medium is passed.

Water to be evaporated in any particular flash evaporator is introduced tangentially to the bottom of the space located between the inner shell 42 and the condenser housing 44. The swirling motion imparted to the water due to its tangential entrance velocity causes the same to have a vortex or depression adjacent the surface of the condenser housing 44. As the water fills the space between the inner shell and the condenser housing it will spill over the weir provided by the upper edge of the inner shell 42 and enter the space between the inner shell 42 and the outer shell 40. The vortex produced by the swirling motion of the water gives it a generally paraboloidal surface so that a large surface area of the water is exposed to the space above it, this space constituting a flash chamber 50. In operation the temperatures of the condenser cooling medium and the impure water supplied to the evaporator are such that a vacuum will be produced in the flash chamber 50 due to the condensing action of the condenser and which vacuum is sufficiently low as to cause a substantial portion of the impure water passed through the evaporator to flash or evaporate from the paraboloidal surface into the flash chamber 50. The vapors released or flashed from the impure water into the flash chamber 50 pass upwardly through the demister 46 and then downwardly through the condenser housing 44 where they are reliquified by the absorption of heat therefrom by the condenser tubes. The condensate so produced flows to a distillate sump 52 located at the bottom of the condenser housing 44. In addition, the impure water supplied to each of the flash evaporators generally contains a certain amount of dissolved or entrained noncondensable vapors which generally consist primarily of carbon dioxide but will be referred to herein as "air" in accordance with the usual terminology. Some of this air is released from the impure water and flows into the flash chamber 50 together with the evaporated water vapor. Due to the cooling action of the condenser 48 the air so released tends to collect at the bottom of the condenser housing 44 above the distillate in the sump 52.

The other components of the system are generally conventional in construction and need not be described in detail. The main condenser 6, the feed water heater 10 and the air cooler 14 are conventional shell and tube heat exchangers. The jet compressor 9 and the air ejectors 16 and 17 are standard commercially available units. The demister 8 consists primarily of a hollow shell 54 having a wire mesh pack 56 in its upper portion which serves to remove entrained liquid from vapors passing from the shell 54 to the jet compressor 9.

Having now described the major components of the illustrated system, its method of operation and the manner in which the various components are interconnected will be described. As mentioned previously, the system is adapted to purify various types of impure water, but is generally used in connection with the purification of sea water. Therefore, in the following discussion sea water will be considered to be the medium to be distilled. This sea water is pumped or otherwise removed from the sea through an inlet line 58 and before being exposed to any evaporating process is used as the cooling medium for the air cooler 14, the various condensers 48, 48 of the flash evaporators $F_1$ to $F_8$, inclusive, and the main condenser 60. This, of course, also causes the sea water to be heated so as to be more readily evaporated. From the inlet line 58 the entrant sea water first passes through the tubes of the air cooler 14 and then into the line 60 which conducts it to the inlet side of the condenser tubes associated with the flash evaporator $F_8$. The condensers 48, 48 in the flash evaporators are connected by lines 62, 62 so that the sea water after entering the condenser 48 of the evaporator $F_8$ will then flow in series through the condensers of the flash evaporators from the condenser of the last evaporator $F_8$ to the condenser of the first evaporator $F_1$. After leaving the condenser of the evaporator $F_1$ the sea water enters the line 64 which conducts it to the tubes of the main condenser 6. After leaving the main condenser some of the sea water is then conducted by the lines 66 and 68 through the feed water heater 10 to the boiler chamber 22 of the first effect evaporator $B_1$.

In the boiler chamber 22 the sea water is heated and boiled to produce vapors which pass through the separating chamber 24 of the evaporator $B_1$ and into the discharge conduit 69 which delivers it to the heat exchanger 28 of the second effect evaporator $B_2$ where the vapors are used as the heat exchange medium for the latter evaporator. By heating the liquid in the boiler chamber of the second effect evaporator $B_2$ the vapors supplied to the heat exchanger thereof are condensed and will drain to the bottom of the steam chest 32 of the evaporator $B_2$. From the steam chest, the distillate so produced is conducted by the line 70 to the line 72 which conducts the distillate to the distillate sump 52 of the first flash evaporator $F_1$. In addition to this, a certain amount of noncondensable vapors or air will also collect in the steam chest 32 of the second effect evaporator $B_2$. This air will also flow out of the steam chest through the line 70, but instead of entering the line 72 the air is conducted to the demister 8 by the line 74. The line 70 is preferably disposed in a substantially horizontal position so that the distillate flowing therethrough will occupy the lower portion of the line and the air the upper portion of the line, and the line 74 communicates with the upper portion of the line 70 so as to draw off only the air and not the liquid distillate.

The heating medium for the first effect evaporator $B_1$ is purified steam which is obtained from a suitable supply which is indicated generally at 76 and which is preferably a steam boiler. Steam from the supply 76 flows through a supply line 78, the jet compressor 9 and a conduit 80 to the inlet conduit 30 of the heat exchanger 28 of the first effect evaporator $B_1$. In addition to the steam passing through the line 78, the medium supplied to the heat exchanger of the first effect evaporator will also include vapors withdrawn from the demister 8 by the jet compressor 9. The source of the vapors flowing from the demister 8 will be later described. The heat exchange medium supplied to the heat exchanger of the first effect evaporator, after passing in heat exchange relationship with the liquid in the boiler thereof, condenses and flows to the steam chest 32 and is withdrawn therefrom through the line 82. This distillate is then cooled by being passed through the shell side of the water heater 10, and is withdrawn from the heater by the vacuum pump 12. Since the line 82 will contain a substantial amount of noncondensable vapors or air in addition to the liquid distillate, the discharge end of the pump 12 is provided with both an air vent 84, through which the air is released, and a distillate discharge line 86. Preferably, some of the distillate from the line 86 is returned to the steam supply 76, as indicated by the broken line of FIG. 1a, as make-up water, and the remaining amount is delivered to a storage container.

The water evaporated by the second effect evaporator $B_2$ consists of the brine discharged by the first effect evaporator $B_1$, and which brine flows from the brine outlet 33 of the evaporator $B_1$ to the boiler chamber of the evaporator $B_2$ through the line 88. The vapors evaporated from this brine pass through the separating chamber of the evaporator $B_2$ and enter the main condenser 6 through the line 90. In the condenser 6 these vapors are reliquified and settle as liquid distillate to the bottom of the condenser, from which the distillate flows to the bottom of the demister 8 through the line 92. In addition to the liquid distillate the main condenser 6 will also contain some noncondensable vapors or air which collect adjacent the bottom of the condenser. These vapors are conducted to the demister 8 through the conduit 94. As mentioned previously, the noncondensable vapors or air which do pass into the demister 8 will be withdrawn therefrom by the jet compressor 9, and after passing through the conduit 80, the heat exchanger 28 of the first effect evaporator $B_1$, the feed water heater 10 and the pump 12 will be discharged to the atmosphere through the vent 84. The distillate which is collected in the demister 8 flows therefrom through the line 96 to the line 72 where it is combined with the distillate from the steam chest of the second effect evaporator $B_2$ for flow to the distillate sump 52 of the first flash evaporator $F_1$. The brine produced by the second effect evaporator $B_2$ flows therefrom through the line 98 and is combined with that part of the sea water leaving the condenser tubes of the main condenser 6 through the line 66 which instead of entering the line 68 enters the line 99. The flows from the brine line 98 and sea water line 99 are combined in the line 100 which conducts the combined flow to the flash chamber inlet of the first flash evaporator $F_1$.

As shown in FIG. 1b, the flash evaporators $F_1$ to $F_8$, inclusive, are connected by lines 102, 102 so that the brine from the line 100 will flow serially through the flash chambers of the flash evaporators from the first evaporator $F_1$ to the last evaporator $F_8$. That is, each of the lines 102, 102 is connected with the flash chamber outlet of one flash evaporator and with the flash chamber inlet of the next flash evaporator so that the brine discharged from one evaporator becomes the brine supplied to the next evaporator. The flow between the various evaporators is induced primarily by pressure differentials existing in the flash chambers 50, 50 of adjacent evaporators, but from FIG. 1b it should also be noted that the heights of the spillover weirs provided by the upper edges of the inner shells 42 decrease in going from the first evaporator $F_1$ to the last evaporator $F_8$. Therefore, in addition to the pressure differential of the flash chambers there also exists a gravity head between adjacent evaporators which assists in inducing the flow through the evaporators.

The brine leaves the flash chamber outlet of the last evaporators $F_8$ through the line 104 and is pumped overboard or otherwise disposed of by the pump 18. As previously mentioned, the brine as it flows through the flash chambers 50, 50 of the flash evaporators is exposed to low pressures existing in the flash chambers, and these pressure are sufficiently low as to cause a substantial portion of the brine to be evaporated into the flash chambers. The vapors so produced in one evaporator flow through the demister 46 where entrained liquid is removed and from there flow downwardly through the condenser housing 44 into heat exchange relationship with the tubes of the condenser which causes the condensable vapors to reliquify and collect in the sump 52. The condensing action of the condensers 48, 48 of the several flash evaporators produces the vacuums existing in the associated flash chambers 50, 50, and the operation of the system is such that the vacuums become progressively greater in going from the first evaporator $F_1$ to the last evaporator $F_8$. That is, the vacuum in the last evaporator $F_8$ is substantially higher than the vacuum in the first evaporator $F_1$, and the vacuum in the evaporators between these two end evaporators vary progressively between these two extremes. Similarly, the temperature of the brine flowing through the flash evaporators is progressively lowered as it flows from the first evaporator $F_1$ to the last evaporator $F_8$, so that the highest vacuum is associated with the lowest brine temperature and the lowest vacuum associated with the highest brine temperature. The temperature and pressure relationships existing in the various flash chambers of the evaporators is such that substantially similar amounts of vapors will be evaporated and condensed in each of the evaporators.

The distillate sumps 52, 52 of the evaporators $F_1$ to $F_8$ are interconnected by a plurality of lines 108, 108, as shown in FIG. 1b, so that the distillate entering the first sump 52 from the line 72 will flow in series through the sumps of the evaporators $F_1$ to $F_8$ and will have added thereto the distillate produced by the latter evaporators. In other words, each of the lines 108, 108 connects the outlet of one sump 52 to the inlet of the next adjacent sump. Each of the lines 108 contains a loop seal 110 which serves to provide a liquid head which prevents the loss of the pressure differential existing between the two evaporators connected by the associated line 108. The distillate from the sump of the last evaporator $F_8$ is withdrawn through the line 112 and is pumped by the pump 20 to a suitable storage container. Of course, the amount of distillate flowing through the line 112 is equal to the amount delivered to the first sump 52 by the line 72 plus the amount produced by all of the evaporators $F_1$ to $F_8$, inclusive.

In addition to the distillate collected in the sumps 52, 52 of the flash evaporators, the condenser housings of these evaporators also will collect noncondensable vapors or air which are released from the brine flowing through the evaporators. The accumulation of this air in the condenser housing is generally undesirable since it will "poison" the condenser by gathering around the condenser tubes, and by so doing exclude the condensable vapors from proper heat exchange contact with the tubes. It is therefore desirable that any air which tends to accumulate in the condenser housings be removed so that the thermal efficiency of the condenser will not be impaired, and one of the primary advantages of this invention is the provision of means which act to efficiently remove this air from the condensers 48, 48 without disturbing the desired pressure differentials existing between the various evaporators and without otherwise disturbing the proper operation of the system.

In accordance with the invention, the air from the evaporators $F_1$ to $F_8$, inclusive, is withdrawn in such a manner that the air from the first given number of evaporators is withdrawn spearately from the air of the remaining evaporators. It has been found that the major portion of the air dissolved or otherwise entrained in the brine supplied to the first flash evaporator $F_1$ requires a certain, but relatively small amount of time in the flash evaporators for its release from the brine. This may be expressed in terms of a "retention time," the retention time being the time required for the release of a given major portion of the total air released from the brine during its passage through the flash evaporators. The retention time is generally such that the major portion of the total released air is released in the first several flash evaporators of the series through which the brine flows. The number of evaporators through which the brine must flow before the major portion of the air is released will, of course, depend, among other things, on the rate of flow of the brine, and this rate of flow and other conditions may be adjusted so that by the time the brine has passed a certain one of the evaporators the major portion of the air will have been released therefrom. For example, under the operating conditions employed in the illustrated system it was found that the major portion of the air in the brine supply was released in the first three evaporators $F_1$, $F_2$ and $F_3$, respectively, while only a very minor amount of air was released in the evaporators $F_4$ to $F_8$, inclusive. Due to the gradual decrease in the pressures within the flash evaporators in going from the first evaporator $F_1$ to the last evaporator $F_8$, the air which is released in the first three evaporators, and which comprises the major portion of the total released air, is at substantially higher pressures than the air released in the other evaporators. By means provided by the present invention the air from the first three evaporators is withdrawn separately from the air released in the remaining five evaporators. The air from the first three evaporators is withdrawn at a pressure substantially equal to the pressure existing in the third evaporator and which pressure, although below atmospheric, is substantially above the pressure at which the remaining minor portion of the air is withdrawn. Therefore, considerably less work is required in the way of compression to bring the air up to atmospheric pressure for removal from the system than would be the case if all of the air were removed at the lower pressure at which the minor portion of the air is withdrawn.

The means for removing the air from the evaportors $F_1$ through $F_8$ include means for providing a flow path for the flow of air between the condenser housings of the first three flash evaporators in the series $F_1$ to $F_8$. The number of evaporators so interconnected may vary, and the actual number in any particular case will depend on the retention time associated with the air in the brine and with the rate of brine flow, among other things. In the illustrated case, it was found that the retention time was about equal to the time required for a particular quantity of brine to flow through the first three evaporators. In other words, after flowing through the first three evaporators, the major portion of the entrained air was released from the brine and only a small or minor portion remained for removal in the following five evaporators. The means for interconnecting the first three evaporators to provide a flow path for the air preferably comprises a line 116 which connects the interior of the condenser housing 44 of the evaporator $F_1$ with the interior of the condenser housing 44 of the evaporator $F_2$. The ends of the line 116 are connected with the associated condenser housings at a point slightly above the distillate sump 52 and the internal diameter of the line 116 is of such a relatively small size as to offer a sufficient resistance to the flow of air therethrough so as not to destroy the pressure differential existing between the evaporators $F_1$ to $F_2$. Although the resistance to the flow of air between the evaporators $F_1$ and $F_2$ in the present case is described as being provided by the small size of the line 116, it is of course within the scope of the invention to provide other flow restriction means for so resisting the flow through the line 116 as to maintain a pressure differential between the evaporators. Between the evaporators $F_2$ and $F_3$ is a line 118, similar to the line 116 which provides communication between the condenser housing of the evaporator $F_2$ and the condenser housing of the evaporator $F_3$. The line 118 is also of such an internal diameter as to provide a flow resistance which maintains a pressure differential between the two associated evaporators.

From this, it will be seen that by virtue of the lines 116 and 118 air collected in the condenser housing of the evaporator $F_1$ will flow to the condenser housing of evaporator $F_2$ and will there be combined with and added to the air collected in the condenser housing of evaporator $F_2$. This flow is then conducted to the housing of the evaporator $F_3$ where it is combined with and added to the air collected by the condenser housing of the evaporator $F_3$. This combined air is then conducted out of the condenser housing of the evaporator $F_3$ by the line 120 which delivers the air to the shell side of the air cooler 14.

The means for withdrawing the air collected by the remaining evaporators $F_4$ to $F_8$ includes a plurality of lines 122, 122 which are connected between the condenser housings of adjacent evaporators in a manner similar to the lines 116 and 118 so that the air collected in the condenser housing of the evaporator $F_4$ will flow serially through the condenser housings of the evaporators $F_5$ to $F_8$ and have added to it the air collected by the condenser housings of the latter evaporators. The combined air from the evaporators $F_4$ to $F_8$, inclusive, is discharged from the condenser housing of the evaporator $F_8$ through the line 124 and is then compressed to the pressure of the air cooler 14 by the air ejector 16 and conducted to the air cooler by the line 126. In the air cooler 14 the air from the first three flash evaporators is combined with the air from the last five evaporators and is withdrawn from the cooler through the line 128 by the ejector 17. From the ejector 17, the air is delivered to the demister 8 by the line 130 and, as previously described, after entering the demister will flow through various other components of the first phase of the system and finally to the atmosphere through the vent 84.

Steam for operating the air ejectors 16 and 17 is supplied from the steam supply 76 through the lines 132 and 134, respectively. The steam which operates the ejector 16 passes with the withdrawn air to the air cooler 14 and is there condensed and conducted to thel ine 112 by the line 132.

The invention claimed is:

1. The method for distilling impure water comprising flowing a continuous stream of impure water through a series of flash evaporators having progressively lower pressures and which pressures are sufficiently low to cause a substantial portion of the impure water passing through each evaporator to be vaporized, said evaporators being divided into first and second groups with the evaporators comprising said second group all being located downstream relative to the flow of impure water from the evaporators comprising said first group, condensing the vapors produced in each evaporator and withdrawing the condensate therefrom, regulating the rate of flow of said impure stream so that by the time a particular quantity of impure water passes through the said first group of evaporators a major portion of the noncondensable vapors entrained therein will be released therefrom into said first group, collecting in each evaporator the noncondensable vapors released from the impure water flowing therethrough, flowing the noncondensable vapors collected in the first evaporator of said first group through the other evaporators of said first group and adding to such flow the noncondensable vapors collected in said other evaporators of said first group, restricting said latter flow as it passes between adjacent evaporators so as to maintain the pressure differential existing between said adjacent evaporators, withdrawing said latter flow from the last of said first group of evaporators at a pressure substantially equal to the pressure of said latter evaporator, flowing the noncondensable vapors collected in the first evaporator of said second group of evaporators through the other evaporators of said second group and adding to such flow the noncondensable vapors collected in said other evaporators of said second group, restricting said latter flow as it passes between adjacent evaporators so as to maintain the pressure differential existing between said adjacent evaporators, and withdrawing said latter flow from the last evaporator of said second group at a pressure substantially equal to the pressure of said latter evaporator.

2. In a distillation plant the combination comprising a plurality of flash evaporators each of which includes a flash chamber having an inlet and an outlet permitting the circulation of impure water through said chamber, a condenser for condensing vapor released from the impure water passing through the flash chamber, and a condenser housing having a sump for collecting the condensate, means connecting the flash chambers of said evaporators in series so that impure water will flow serially through the flash chambers thereof from the inlet of the first to the outlet of the last of said plurality of evaporators, said evaporators being divided into first and second groups with the evaporators comprising second group all being located downstream relative to the flow of impure water from the evaporators comprising said first group, means for regulating the pressure within said evaporators so that the pressure within each of said evaporators is lower than the pressure within the preceding evaporator of said series with the result that said impure water is exposed to progressively lower pressures as it passes progressively through said evaporators, means for withdrawing condensate from the sumps of said evaporators, means providing a first flow path for conducting the noncondensable vapors collected in the first evaporator of said first group progressively through the other evaporators of said group so that the noncondensable vapors collected in the other evaporators of the first group are combined with and added to the flow, the said first flow path providing a sufficient resistance to the flow of noncondensable vapors between adjacent evaporators as to maintain the pressure differential therebetween, means providing a second flow path for conducting the noncondensable vapors collected in the first evaporator of said second group progressively through the other evaporators of said second group so that the noncondensable vapors collected in the other evaporators of the second group are combined with and added to the flow, the said second flow path providing a sufficient resistance to the flow of noncondensable vapors between adjacent evaporators as to maintain the pressure differential therebetween, a first conduit connected with the end of said first flow path so as to withdraw the combined noncondensable vapors of said first group of said evaporators from the last evaporator in said first group, and a second conduit connected with the end of said second flow path so as to withdraw the combined noncondensable vapors of said second group of evaporators from the last evaporator in said second group separately from the combined noncondensable vapors of said first group of evaporators.

3. The combination as defined in claim 2 further characterized by said second conduit containing a pump for raising the pressure of the noncondensable vapors flowing therethrough to the pressure of the noncondensable vapors flowing through said first conduit, and means downstream of said pump for combining the flows of said first and second conduits.

References Cited in the file of this patent
UNITED STATES PATENTS

| | | |
|---|---|---|
| 1,552,534 | Bancel | Sept. 8, 1925 |
| 1,552,562 | Kirgan | Sept. 8, 1925 |
| 2,759,882 | Worthen et al. | Aug. 21, 1956 |
| 2,908,618 | Bethon | Oct. 13, 1959 |
| 2,934,477 | Siegfried | Apr. 26, 1960 |